(12) United States Patent
Chu et al.

(10) Patent No.: US 7,432,994 B2
(45) Date of Patent: Oct. 7, 2008

(54) LIQUID CRYSTAL DISPLAY DEVICE AND FABRICATION METHOD THEREOF

(75) Inventors: Hung-Jen Chu, Nantou County (TW); Chien-Kuo He, Taipei County (TW); Meng-Feng Hung, Changhua County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 366 days.

(21) Appl. No.: 11/161,021

(22) Filed: Jul. 20, 2005

(65) Prior Publication Data
US 2006/0001790 A1 Jan. 5, 2006

Related U.S. Application Data

(62) Division of application No. 10/707,085, filed on Nov. 20, 2003, now Pat. No. 7,130,006.

(51) Int. Cl.
*G02F 1/136* (2006.01)
*G02F 1/1333* (2006.01)

(52) U.S. Cl. .................................. 349/44; 349/111
(58) Field of Classification Search ................ 349/111, 349/44
See application file for complete search history.

(56) References Cited

U.S. PATENT DOCUMENTS 6,737,289 B2 * 5/2004 Woo et al. .................. 438/30
2006/0290862 A1 * 12/2006 Yanagawa et al. .......... 349/139

* cited by examiner

*Primary Examiner*—James A Dudek
(74) *Attorney, Agent, or Firm*—Jianq Chyun IP Office

(57) ABSTRACT

A liquid crystal display device comprising a first substrate, a second substrate, a liquid crystal layer and a shading film is provided. The first substrate includes a display region and a non-display region. The liquid crystal layer is sandwiched between the first substrate and the second substrate. The shading film is located between the first substrate and the liquid crystal layer covering the non-display region. With the shading film covering the entire non-display region, the problem of light leakage from the edge of the display device is resolved.

7 Claims, 6 Drawing Sheets

LIQUID CRYSTAL DISPLAY DEVICE AND FABRICATION METHOD THEREOF

CROSS-REFERENCE TO RELATED APPLICATION

This application is a divisional of a prior application Ser. No. 10/707,085, filed Nov. 20, 2003, now pending.

BACKGROUND OF THE INVENTION

1. Field of the Invention

The present invention relates to a display device and fabricating method thereof. More particularly, the present invention relates to a liquid crystal display device and fabricating method thereof.

2. Description of the Related Art

With big advance in electronic technologies, digital video products or imaging devices has become one of the most common electronic gadgets in our daily life. Among various video products and imaging devices, display devices inarguably occupy a central position because a user must extract information from a display device, or in the case of performing a real-time control, receive real-time data from a display device.

To fit the lifestyle of modern day people, the size and weight of video and imaging products must be reduced as much as possible. Although cathode ray tubes (CRT) still has some advantages, bulkiness and volume are the two major setbacks that reduce its popularity in the future. With breakthroughs in photo-electronic and semiconductor fabrication technologies, panel type displays such as the liquid crystal displays are starting to replace the conventional CRT because of its low operating voltage, radiation free operation and light-weight and streamline body. In fact, researches in liquid crystal display and other flat panel displays such as plasma display panel and electro-luminance displays have dominated the field in recent years due to its potential as a mainstream product in the market.

In general, a thin film transistor (TFT) liquid crystal display comprises a thin film transistor array substrate, a color filter substrate and a liquid crystal layer. FIG. 1 is a schematic cross-sectional view of a conventional liquid crystal display panel. The liquid crystal display panel in FIG. 1 comprises a color filter substrate 100, a thin film transistor array substrate 102, a sealant 104 and a liquid crystal layer 106. The liquid crystal layer 106 is enclosed within the space bounded by the color filter substrate 100, the thin film transistor array substrate 102 and the sealant 104. The color filter substrate 100 further comprises a color filter 113 and a black matrix 114. Furthermore, the thin film transistor array substrate 102 comprises a display region 108 and a non-display region 110. The non-display region 110 has a plurality of lead lines 112 serving as drivers for operating the display device.

To form the liquid crystal layer 106, the sealant 104 is placed between the substrates 100 and 102 to form an enclosed space. Thereafter, a small quantity of liquid crystal is gradually filled into the space between the color filter substrate 100 and the thin film transistor array substrate 102 under a capillary effect due to the presence of an external atmospheric pressure. Because the injection speed of liquid crystal under capillary effect is slow, other injection techniques such as the one-drop fill (ODF) process is deployed. In the one-drop fill process, a layer of UV sealant is coated on the thin film transistor array substrate 102 (or the color substrate 100) to form a sealant 104. Each drop of liquid crystal is dropped inside the area enclosed by the sealant 104. Thereafter, the color filter substrate 100 (or the thin film transistor array substrate 102) is placed over the sealant 104. The sealant 104 is illuminated with UV light so that the sealant 104 hardens so that the sealant 104 bonds the color filter substrate 100 and the thin film transistor array substrate 102 together.

Using the ODF technique, time for injecting liquid crystal into a liquid crystal display panel is reduced considerably. For example, only 2 hours are required to fill a 30 inches panel using the ODF technique. If the same display panel is filled using the capillary injection technique, roughly five days are required. Hence, production time is shortened considerably. Furthermore, ODF technique requires only 40% of the liquid crystal needed in a capillary injection process. However, care must be executed to prevent any contamination of the liquid crystal by the sealant that may lead to liquid crystal display problems. In general, the black matrix (BM) 114 on the color filter substrate 100 has to move a definite distance toward the central area of the panel. With the black matrix (BM) 114 moved from the edges, a strip of area 116 adjacent to the edge is no longer covered with any barrier. Since the gap between lead lines 112 in the non-display region 110 has no barrier, light can easily leak from the edge of the display panel.

SUMMARY OF THE INVENTION

Accordingly, one objective of the present invention is to provide a liquid crystal display device capable of minimizing the amount of light leakage from the edges of the display device.

Another objective of the present invention is to provide a method of fabricating a liquid crystal display device capable of minimizing the amount of light leakage from the edges of the display device without increasing the number of processing steps.

To achieve these and other advantages and in accordance with the purpose of the invention, as embodied and broadly described herein, the present invention provides a liquid crystal display device. The display device comprises a first substrate, a second substrate, a liquid crystal layer and a first shading film. The first substrate includes a display region and a non-display region positioned around the periphery of the first substrate. The liquid crystal layer is sandwiched between the first substrate and the second substrate. The first shading film is set between the first substrate and the liquid crystal layer within the non-display region. Furthermore, the first substrate further includes at least a thin film transistor with at least a gate and a source/drain.

The present invention also provides a method of fabricating a liquid crystal device. First, a first substrate is provided. The first substrate has a display region and a non-display region positioned around the periphery of the display region. Thereafter, at least a thin film transistor is formed within the display region. The method of forming the thin film transistor includes forming a gate over the first substrate, forming an insulating layer over the first substrate to cover the gate, forming a channel layer over the insulating layer above the gate and forming a source source/drain region over the channel layer. The process of fabricating the thin film transistor further includes forming a first shading film within the non-display region. The first shading film is formed together with either the gate or the source/drain. Thereafter, a second substrate is provided. A sealant is formed on the first substrate or the second substrate. A liquid crystal layer is formed on the substrate surface with the sealant. The first substrate and the second substrate are bonded together and then the sealant is illuminated.

In the aforementioned liquid crystal display device and fabricating method, the first shading film is set over the non-display region in such a way that the entire non-display region is covered.

The aforementioned liquid crystal display device and fabricating method thereof further includes forming a plurality of lead lines within the non-display region. The lead lines and the gate are fabricated together or the lead lines and the source/drain are fabricated together. When the lead lines and the gate are fabricated together, the first shading film and the source/drain are formed at the same time in a position above the gap between neighboring lead lines within the non-display region. Alternatively, an additional second shading film is set up within the non-display region. The second shading film and the gate are formed together and positioned between neighboring lead lines. Furthermore, the second shading film is electrically isolated from its neighboring lead lines. The first shading film is set over the gap between the second shading film and an adjacent lead line.

When the lead lines and the source/drain are formed at the same time, the first shading film and the gate are fabricated together and positioned underneath the gap between neighboring lead lines within the non-display region. Alternatively, an additional second shading film is set within the non-display region. The second shading film and the source/drain are formed together and positioned between neighboring lead lines. Furthermore, the second shading film is electrically isolated from its neighboring lead lines. The first shading film is set underneath the gap between the second shading film and an adjacent lead line.

In the present invention, an additional shading film is set between the liquid crystal layer and the first substrate of the liquid crystal display device. The shading film essentially blocks out any light trying to escape through the non-display region near the edge of the display device.

In the process of fabricating the liquid crystal display device, the first shading film is formed within the non-display region close to the edge of the substrate together with the source/drain (or the gate). Hence, there is no need to introduce extra processing steps just to prevent any light leakage from the edge of the display device.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
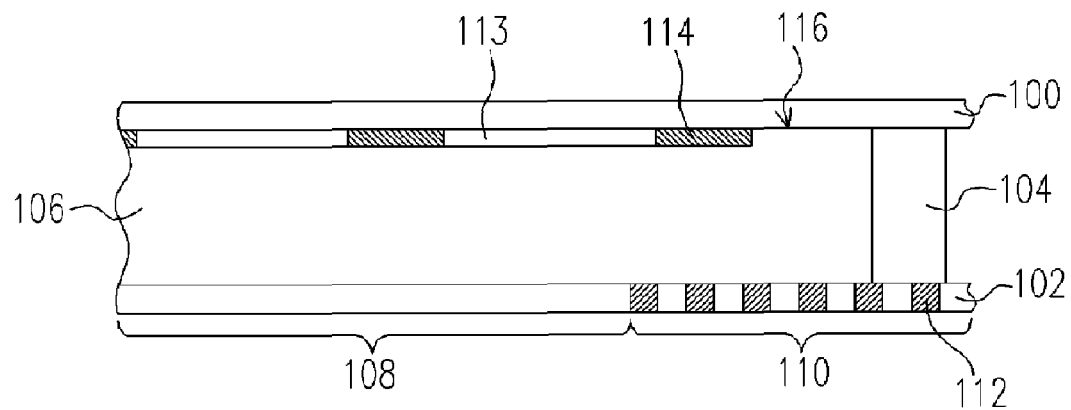
FIG. 1 is a schematic cross-sectional view of a conventional liquid crystal display panel.

Reference will now be made in detail to the present preferred embodiments of the invention, examples of which are illustrated in the accompanying drawings. Wherever possible, the same reference numbers are used in the drawings and the description to refer to the same or like parts.

Figure 2:
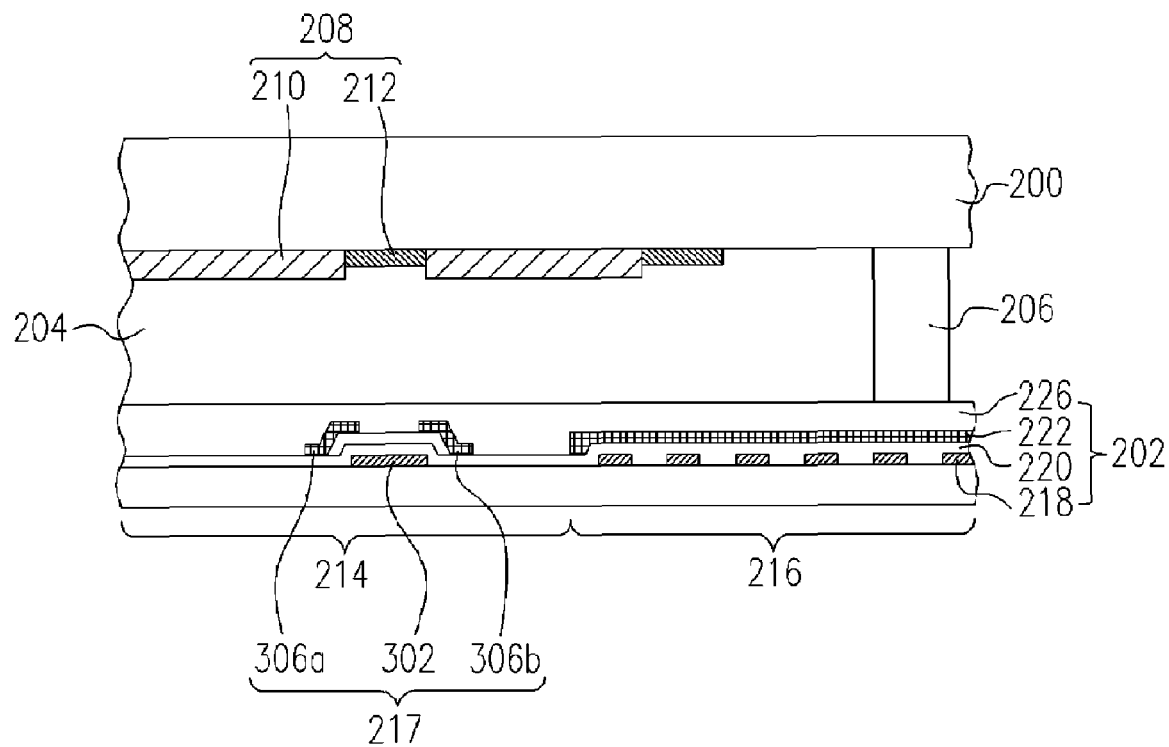
FIG. 2 is a schematic cross-sectional view of a liquid crystal display device according to a first preferred embodiment of this invention.

FIG. 2 is a schematic cross-sectional view of a liquid crystal display device according to a first preferred embodiment of this invention. The liquid crystal display device comprises a first substrate 202, a second substrate 200, a liquid crystal layer 204 and a first shading film 222. The second substrate 200 is a color filter substrate with a color filter 208 thereon, for example. The color filter 208 further comprises a plurality of red (R) filter films 210, green (G) filter films 210 or blue (B) filter films 210. The color filter 208 are organized into a mosaic, a delta or a stripe pattern. In addition, a net-like black matrix 212 is also formed in the space between the color filter 208. A plurality of other film layers (not shown) may also be formed over the color filter 208 such as a passivation film 226, a metal electrode film and an alignment film. The passivation film 226 can protect the color filter 208, and make it planar. Furthermore, the electrode film may be fabricated using indium-tin-oxide (ITO) or equivalent materials. The alignment film serves as a guide to orient any liquid crystal molecules on the film to a pre-defined direction (alignment) so that the liquid crystal molecules are pre-tilted. The other surface of the second substrate 200 may include a polarizing plate (not shown) that provides a display function.

The first substrate 202 is thin film transistor array substrate, for example. The first substrate 202 comprises a display region 214 and a non-display region 216. The display region 214 includes at least a thin film transistor 217 (having a gate 302, a source 306a and a drain 306b). The non-display region 216 includes a plurality of lead lines 218 thereon. Furthermore, an insulation layer 220 that joins with the gate insulation layer of the thin film transistor 217 is also formed over the lead lines 218.

The first shading film 222 is set between the second substrate 202 and the liquid crystal layer 204 within the non-display region 216. The first shading film 222 is formed using a substance selected from a group of conductive and non-transparent materials, for example.

It is to be noted that the first shading film 222 and the source 304a/drain 304b (306a/306b) in this embodiment are fabricated using the same film material. In other words, the first shading film 222 and the source 306a/drain 306b are formed together in the same step. Similarly, the lead lines 218 and the gate 302 are fabricated using the same film material. In an alternative embodiment, the first shading film 222 and the gate 302 are fabricated using the same film material. In other words, the first shading film 222 and the gate 302 are formed together in the same step. In this case, the lead lines 218 and the source 306a/drain 306b are also fabricated using the same film material.

Figure 6:
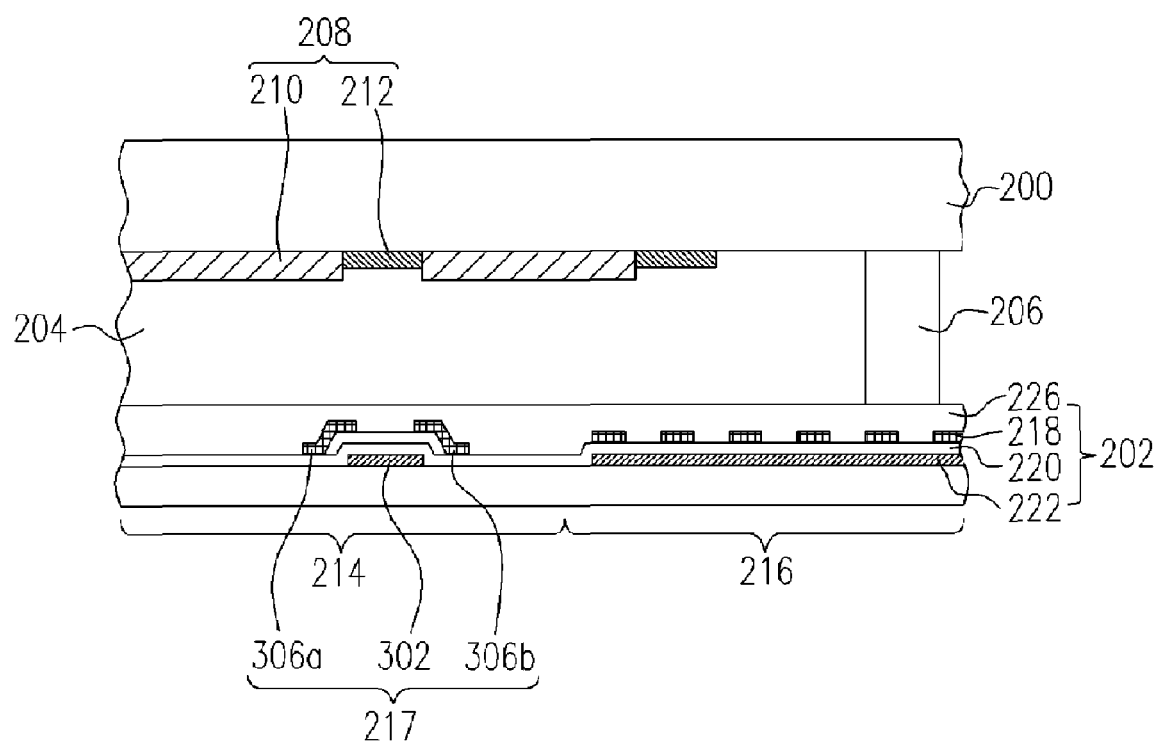
FIG. 6 is a schematic cross-sectional view of a liquid crystal display device according to a fourth preferred embodiment of this invention.

The first shading film 222 is set on the non-display region 216 so that the first shading film 222 covers the non-display region 216 completely (as shown in FIG. 2) or lies underneath the non-display region 216 (as shown in FIG. 6).

Figure 3:
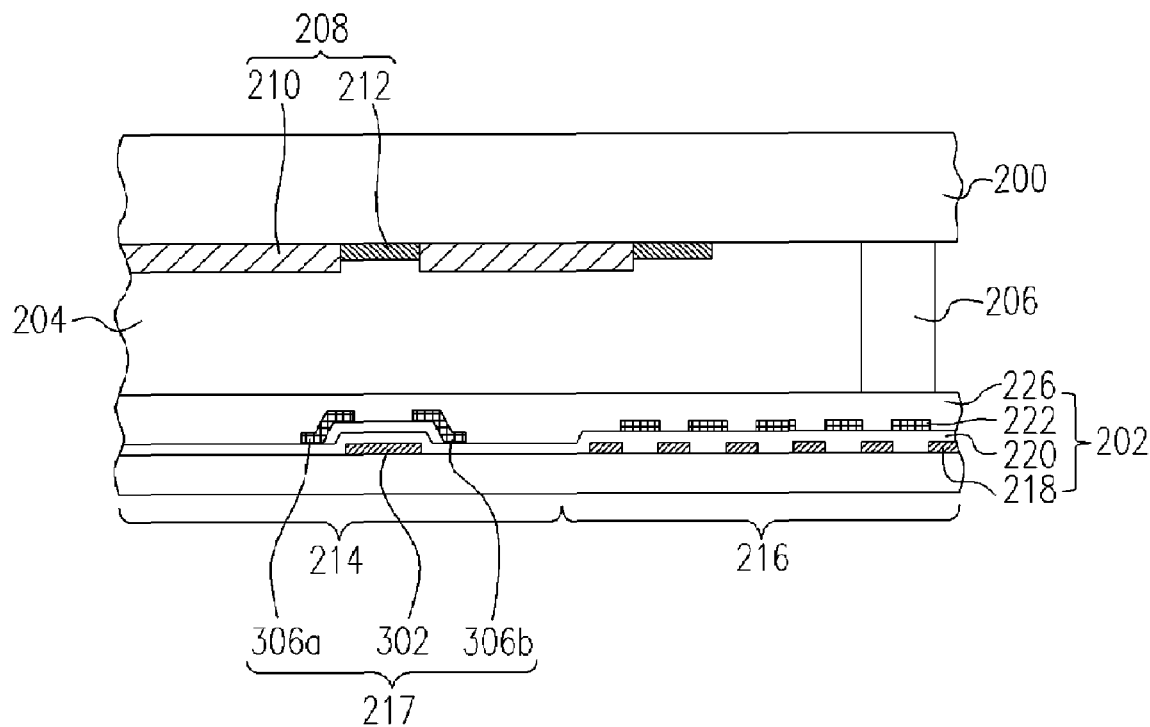
FIG. 3 is a schematic cross-sectional view of a liquid crystal display device according to a second preferred embodiment of this invention.
Figure 7:
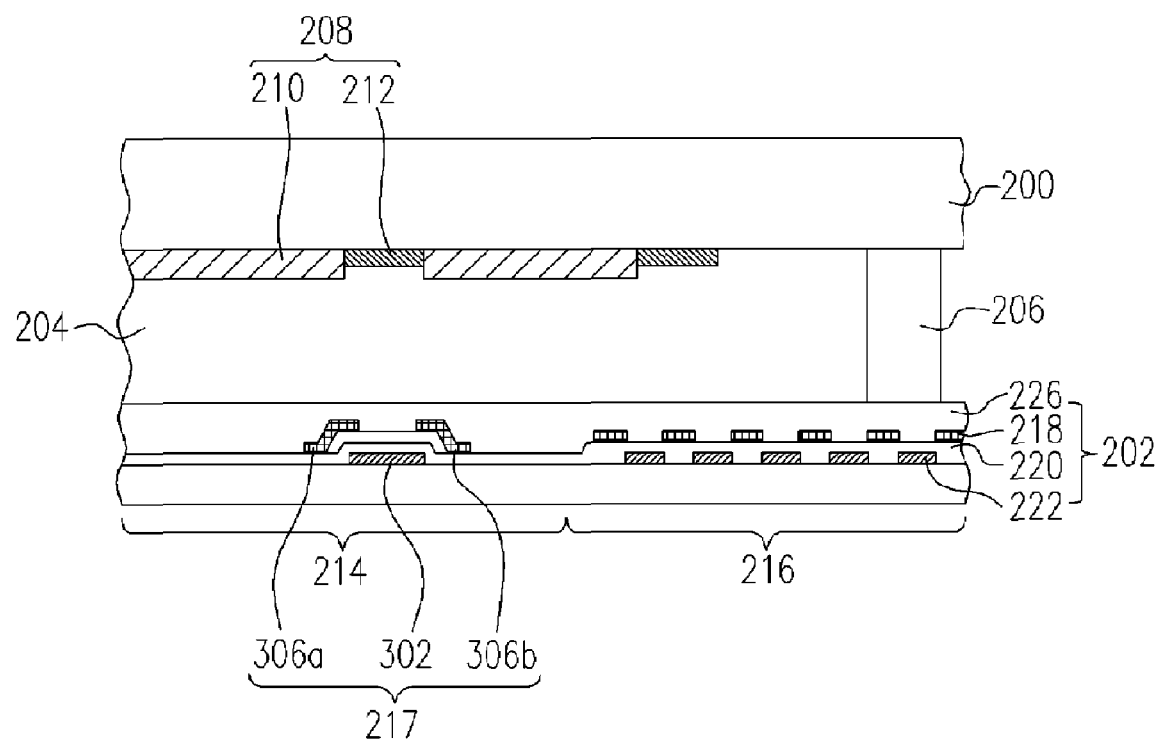
FIG. 7 is a schematic cross-sectional view of a liquid crystal display device according to a fifth preferred embodiment of this invention.

In another embodiment of this invention, the first shading film 222 is set over (or underneath) the gaps between neighboring lead lines 218 within the non-display region 216 (as shown in FIG. 3 and FIG. 7). With this structural setup, the first shading film 222 is prevented from forming a short circuit with neighboring lead lines 218 and the first shading film 222 due to some imperfection in the process of fabricating the first shading film 222.

Figure 4:
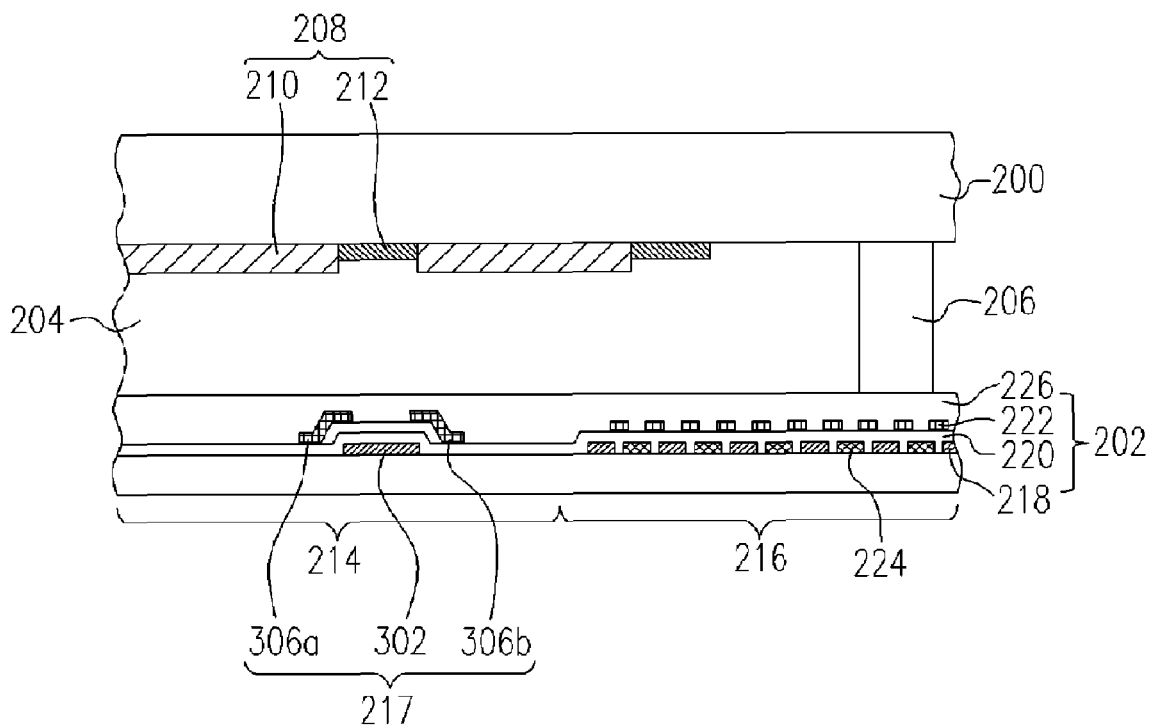
FIG. 4 is a schematic cross-sectional view of a liquid crystal display device according to a third preferred embodiment of this invention.
Figure 8:
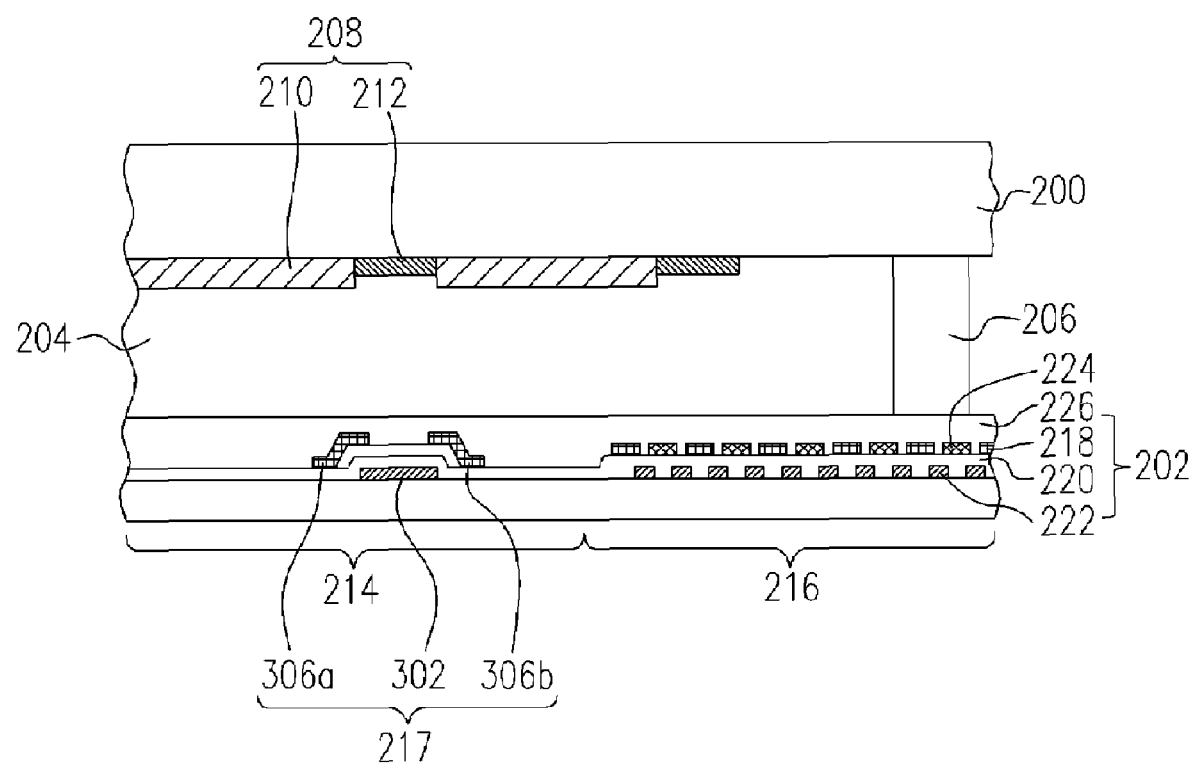
FIG. 8 is a schematic cross-sectional view of a liquid crystal display device according to a sixth preferred embodiment of this invention.

In another embodiment, a second shading film 224 is formed within the non-display region 216. The second shading film 224 is set between neighboring lead lines 218 and electrically isolated from them. Furthermore, the first shading film 222 is positioned over (or underneath) the gap between the second shading film 224 and the lead line 218 (as shown in FIG. 4 and FIG. 8). With this structural setup, the first shading film 222 is prevented from forming a short circuit with neighboring lead lines 218 and the first shading film 222 due to some imperfection in the process of fabricating the first shading film 222.

In addition, the sealant 206 is set between the first substrate 202 and the second substrate 200 to form an interior space for holding the liquid crystal molecules. The sealant 206 is fabricated from an UV photosensitive material, for example.

Obviously, other film layers may also be formed over the first substrate 202. For example, a passivation film 226, an electrode film (not shown) and an alignment film (not shown) are sequentially formed over the first substrate 202. Furthermore, a polarizing plate (not shown) may also be formed on the other surface of the first substrate 202.

Accordingly, an additional shading film is formed between the liquid crystal layer and the first substrate 202. The shading film is set in such a way that the non-display region is completely covered by the shading film or the shading film is set over the gap between neighboring lead lines. Alternatively, a shading film is first set in the gap between neighboring lead lines and then another shading film is set over the gap between the first shading film and the lead lines. Hence, this invention provides an effective means of preventing light leakage from the edge of the display device (the non-display region).

Figure 5A:
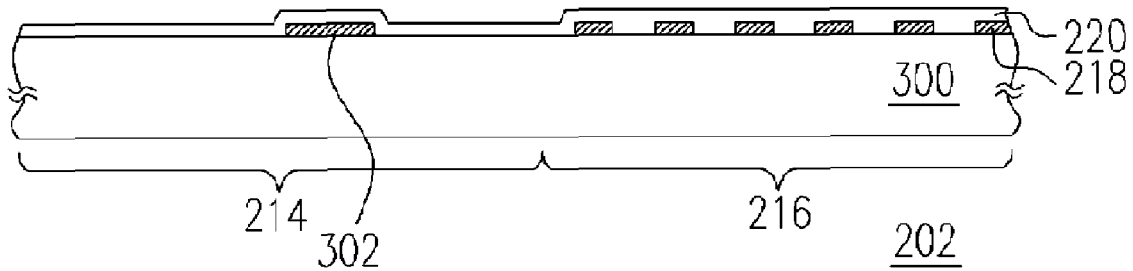
FIGS. 5A through 5D are schematic cross-sectional views showing the steps for fabricating a liquid crystal display device according to one preferred embodiment of this invention.
Figure 5B:
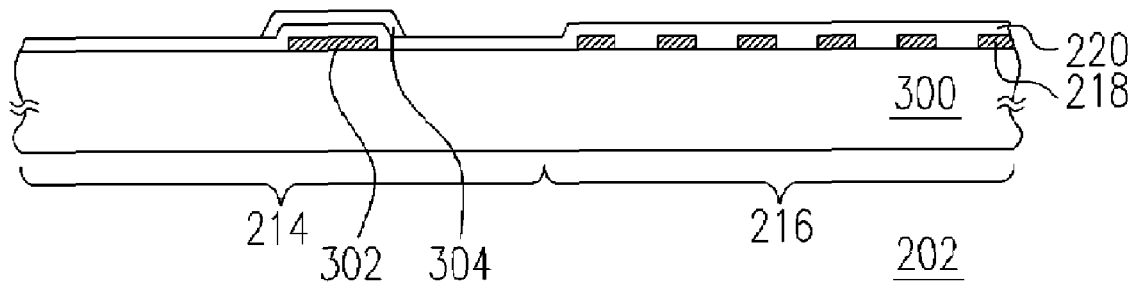
Figure 5C:
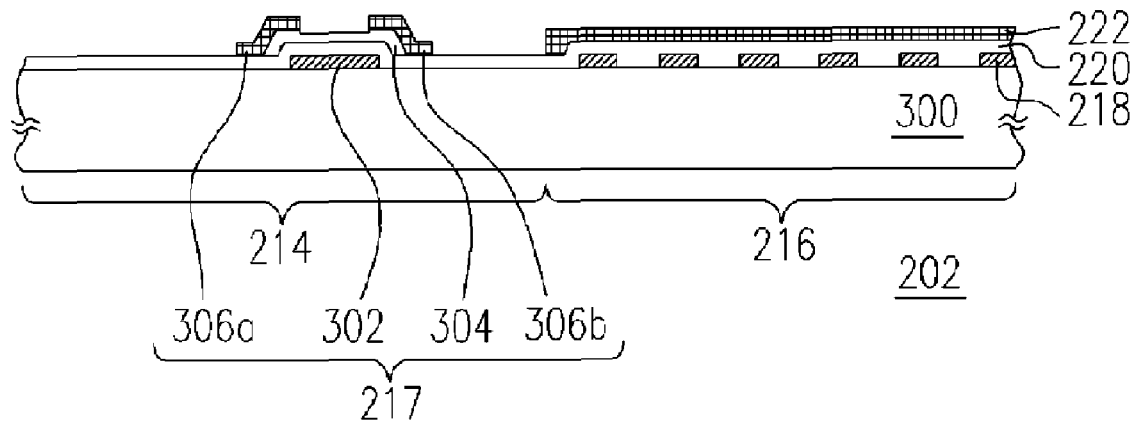

FIGS. 5A through 5D are schematic cross-sectional views showing the steps for fabricating a liquid crystal display device according to one preferred embodiment of this invention. In particular, FIGS. 5A through 5C illustrates the process of fabricating a substrate 202. As shown in FIG. 5A, a substrate 300 is provided. The substrate 300 includes a display region 214 and a non-display region 216 positioned around the periphery of the substrate 300. The substrate 300 is a glass substrate or a transparent plastic substrate, for example. Thereafter, a metallic layer having a thickness of several thousand angstroms is formed over the substrate 300 and then patterned to form at least a gate 302 within the display region 214 and a plurality of lead lines 218 within the non-display region 216. The metallic layer is formed, for example, by performing a sputtering. The lead lines 218 subsequently serve as driving lines for the device. Next, an insulation layer 220 is formed over the substrate 300 globally to cover the gate 302 and the lead lines 218. The insulation layer 220 is, for example, a silicon nitride layer or a silicon oxide layer formed by performing a plasma chemical vapor deposition As shown in FIG. 5B, a channel material layer (not shown) is formed over the insulation layer 220 and then patterned to form a channel layer 304. The channel layer 304 is positioned over the insulation layer 220 above the gate 302 and is fabricated using amorphous silicon, for example.

As shown in FIG. 5C, another metallic layer (not shown) is formed over the substrate 300 and then patterned to form a source 306a/drain 306b and a first shading film 222. The first shading film 222 is fabricated using a substance selected from a group of conductive and non-transparent materials. The gate 302, the channel layer 304 and the source 306a/306b together form a thin film transistor 217. It is to be noted that in one embodiment of this invention, the first shading film 222 covers the entire non-display region 216 (as shown in FIG. 2 and FIG. 5C). In another embodiment, the first shading film 222 is formed over the gap between neighboring lead lines 218 (as shown in FIG. 3) so that a short circuit between the first shading film 222 and the lead lines 218 due to manufacturing defect is prevented.

In another embodiment, in the process of forming the lead lines 218, a second shading film 224 is also patterned out in the gap between neighboring lead lines 218. The second shading film 224 is electrically isolated from neighboring lead lines 218 (as shown in FIG. 4) and is fabricated using a substance selected from a group of conductive and non-transparent materials. Thereafter, in the process of patterning out the source 306a/drain 306b, the first shading film 222 is also simultaneously patterned so that the patterned first shading film 222 is located above the gap between the second shading film 224 and neighboring lead lines 218. Consequently, the probability of having a short circuit between the first shading film 222 and the lead lines 218 due to an imperfection in the manufacturing process is minimized.

Obviously, other film layers may also be formed over the substrate 300. For example, a passivation film 226, an electrode film (not shown) and an alignment film (not shown) are sequentially formed over the substrate 202. Furthermore, a polarizing plate (not shown) may also be formed on the other surface of the substrate 300.

Figure 5D:
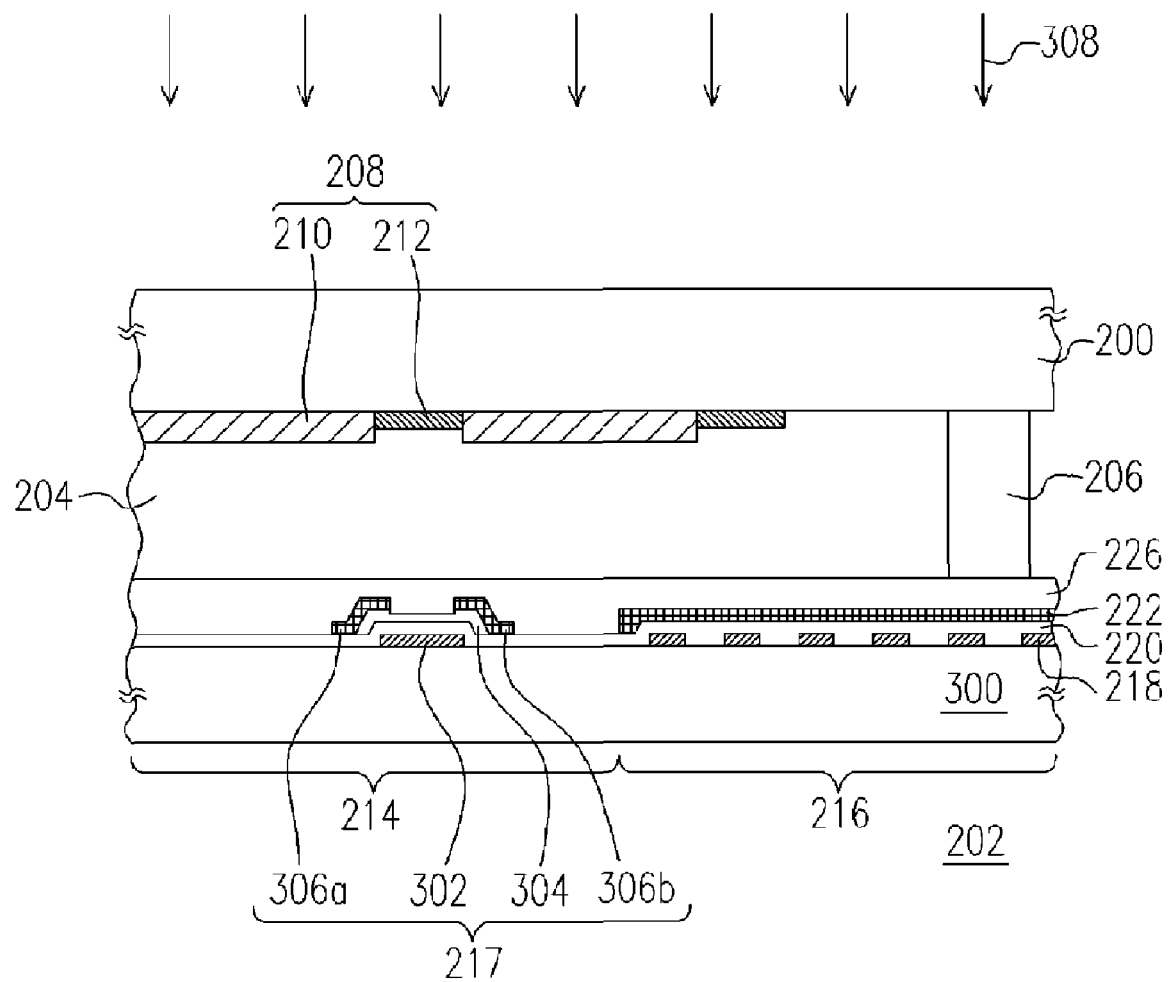

As shown in FIG. 5D, a color filter substrate 200 is provided. The color filter substrate 200 has at least a black matrix 212 and a color filter 210 thereon. A sealant 206 is coated on the substrate 300 or on the color filter substrate 200 just outside the black matrix 212 to form an enclosed area. Thereafter, liquid crystal 204 is dropped into the area enclosed by the UV sealant 206 and then the thin film transistor substrate 300 and the color filter substrate 200 are pressed together. Finally, ultraviolet light 308 is shone to harden the sealant 206 and bind the two substrates (200 and 300) together.

In the aforementioned embodiment, the first shading film 222 and the source 306a/drain 306b are formed together in the same step. However, if the lead lines 218 and the source 306a/drain 306b are formed together in the same step, the first shading film 222 and the gate 302 can be formed together in the same step. When the first shading film 222 and the gate 302 are formed together in the same step, the first shading film 222 may lie underneath the non-display region 216 (as shown in FIG. 6) in one embodiment. Alternatively, the first shading film 222 may lie underneath the gap between neighboring lead lines 218 (as shown in FIG. 7).

In another embodiment, the second shading film 224 is formed in the gap between neighboring lead lines 218 and are formed together in the same step. However, the second shading film 224 is electrically isolated from neighboring lead lines 218 (as shown in FIG. 8). The first shading film 222 is formed underneath the gap between the second shading film 224 and the lead lines 218. With this setup, a short circuit between the first shading film 222 and the lead lines 218 can be prevented.

According to the method of fabricating liquid crystal display device in this invention, a shading film is formed within the non-display region of a substrate near the edge of the substrate in the process of fabricating the source/drain (or gate). Alternatively, a second shading film the gate (or source/drain) are formed in the same step. Hence, there is no need to introduce an extra step in the fabricating process just to prevent the leakage of light from the edges of the display device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a liquid crystal display device, comprising the steps of:
    providing a first substrate having a display region and a non-display region around the periphery of the display region;
    forming at least a thin film transistor in the display region, comprising:
        forming a gate over the first substrate;
        forming an insulation layer over the first substrate to cover the gate;
        forming a channel layer over the insulation layer above the gate;
        forming a source/drain over the channel layer,
        forming a plurality of lead lines over the first substrate within the non-display region;
        wherein the process of fabricating the thin film transistor further includes forming a first shading film within the non-display region such that the first shading film is formed together with either the gate or the source/drain, and when the first shading film and the gate are formed together in a same step, the lead lines and the source/drain are also formed together on the first substrate, and the first shading film is formed over the gap between neighboring lead lines within the non-display region;
    providing a second substrate comprising a black matrix thereon;
    forming a sealant on the surface of either the first substrate or the second substrate;
    forming a liquid crystal layer on the surface of the substrate with the sealant;
    binding the first substrate and the second substrate together, wherein a space is existed between the sealant and the black matrix, and the first shading film is formed at the region where the space is located and extends to the outside of the sealant; and
    illuminating the sealant with light.

2. The method of claim 1, wherein the first shading film covers the insulation layer within the non-display region.

3. The method of claim 1, wherein in the step of forming the gate within the display region and the lead lines within the non-display region, further comprises forming a second shading film between neighboring lead lines such that the second shading film is electrically isolated from the lead lines.

4. The method of claim 3, wherein the first shading film is formed over the gap between the second shading film and neighboring lead lines.

5. A method of fabricating a liquid crystal display device, comprising the steps of:
    providing a first substrate having a display region and a non-display region around the periphery of the display region;
    forming at least a thin film transistor in the display region, comprising:
        forming a gate over the first substrate;
        forming an insulation layer over the first substrate to cover the gate;
        forming a channel layer over the insulation layer above the gate;
        forming a source/drain over the channel layer,
        forming a plurality of lead lines over the first substrate within the non-display region;
        wherein the process of fabricating the thin film transistor further includes forming a first shading film within the non-display region such that the first shading film is formed together with either the gate or the source/drain, and when the first shading film and the gate are formed together in a same step, the lead lines and the source/drain are also formed together on the insulation layer, and the first shading film lies underneath the gap between neighboring lead lines within the non-display region;
    providing a second substrate comprising a black matrix thereon;
    forming a sealant on the surface of either the first substrate or the second substrate;
    forming a liquid crystal layer on the surface of the substrate with the sealant;
    binding the first substrate and the second substrate together, wherein a space is existed between the sealant and the black matrix, and the first shading film is formed at the region where the space is located and extends to the outside of the sealant; and
    illuminating the sealant with light.

6. The method of claim 5, wherein in the step of forming a source/drain over the channel layer and the lead lines over the insulation layer within the non-display region, further comprises forming a second shading film between the neighboring lead lines such that the second shading film is electrically isolated from the neighboring lead lines.

7. The method of claim 6, wherein the first shading film lies underneath the gap between the second shading film and the neighboring lead lines.

* * * * *